United States Patent [19]

Tecco et al.

[11] Patent Number: 5,242,146
[45] Date of Patent: Sep. 7, 1993

[54] ENGINE MOUNT HAVING IMPROVED VIBRATION ISOLATION

[75] Inventors: Thomas C. Tecco; Thomas J. Henry; Mark N. Sanders; Andrew J. Zielinski, all of Ft. Wayne, Ind.; Romulus Racca, Weston, Mass.

[73] Assignees: Navistar International Transportation Corp., Chicago, Ill.; Barry Wright Corporation, Newton Lower Falls, Mass.

[21] Appl. No.: 271,113

[22] Filed: Nov. 14, 1988

[51] Int. Cl.⁵ .................................................. F16F 9/00
[52] U.S. Cl. ............................... 248/638; 248/636; 267/140.5; 267/141.1; 267/293; 267/294
[58] Field of Search .......... 248/638, 562, 566, 632, 248/636, 635; 267/140.5, 141.1, 153, 293, 294

[56] References Cited

U.S. PATENT DOCUMENTS

| | | | |
|---|---|---|---|
| 1,823,429 | 9/1931 | Jansson et al. | 248/635 |
| 1,871,376 | 8/1932 | Keys | 248/635 |
| 3,322,377 | 5/1967 | Morlon | 267/153 X |
| 3,430,901 | 3/1969 | Cauvin | 248/632 X |
| 4,270,625 | 6/1981 | Nishimura et al. | 248/638 X |
| 4,288,063 | 9/1981 | Brenner et al. | 248/562 X |
| 4,418,898 | 12/1983 | Atsumi et al. | 267/141.1 X |
| 4,693,455 | 9/1987 | Andrä | 248/562 X |
| 4,767,106 | 8/1988 | Le Fol | 248/562 X |

FOREIGN PATENT DOCUMENTS

| | | | |
|---|---|---|---|
| 2317856 | 11/1974 | Fed. Rep. of Germany | 267/293 |
| 2640703 | 3/1978 | Fed. Rep. of Germany | 248/632 |
| 1114553 | 4/1956 | France | 267/141.1 |
| 2098973 | 3/1972 | France | 267/294 |
| 0137511 | 10/1979 | Japan | 248/632 |
| 167025 | 4/1959 | Sweden | 267/141:1 |
| 0614797 | 12/1948 | United Kingdom | 267/294 |
| 616689 | 1/1949 | United Kingdom | 248/635 |
| 677823 | 8/1952 | United Kingdom | 248/635 |
| 904925 | 9/1962 | United Kingdom | 248/632 |

Primary Examiner—Karen J. Chotkowski

[57] ABSTRACT

An engine mount for mounting an automotive vehicle engine to the automotive vehicle chassis. The mount comprises a vibration isolator portion which is designed with relatively low stiffness to provide increased vibration isolation. Excessive displacements are avoided by snubbers. Snubbing action in one direction is provided by a circular snubber that is disposed in spaced relation to the vibration isolator portion. Snubbing action in other directions is provided by the particular design of the vibration isolator portion. Embodiments of both a front and a rear engine mount are disclosed.

22 Claims, 4 Drawing Sheets

ENGINE MOUNT HAVING IMPROVED VIBRATION ISOLATION

BACKGROUND AND SUMMARY OF THE INVENTION

This invention relates generally to engine mounts that are used to mount an automotive vehicle engine to the automotive vehicle chassis. More specifically, the invention relates to engine mounts that have improved vibration isolation but do not allow excessive engine displacement. The mounts are particularly useful in medium and heavy duty trucks.

In automotive vehicles such as trucks, it is customary practice to mount the engine on the chassis by means of engine mounts. Such mounts typically comprise a combination of metal and elastomeric parts. In order to be acceptable, an engine mounting system must meet several requirements. In particular, the engine mounts must be strong and durable, and they must provide a satisfactory level of vibration isolation without allowing excessive engine motion.

Heretofore, most engine mounting systems for medium and heavy duty trucks were designed to have isolators with fairly high stiffnesses in order to maintain adequate fatigue life and to limit engine motion to an acceptable level. Unfortunately, mounts of this design provided less than optimum vibration isolation performance.

The present invention relates to new and improved engine mounts which provide adequate fatigue life and good vibration isolation performance while limiting engine motion to an acceptable level. A mount according to principles of the present invention is constructed of a new and unique organization and arrangement of metal and elastomeric parts so as to have a relatively low stiffness vibration isolator portion, about the nominal static design loads, in combination with snubber portions that limit excessive engine displacement. Specific examples of mounts will hereinafter be disclosed as preferred embodiments of the invention.

Specific geometries of the metal and elastomeric parts comprising each mount can provide different stiffnesses along the principal axes of each mount to obtain desired vibration isolation levels and hence limit vibration inputs into the truck. When higher input loads are applied to the mounts, the snubbers become active to limit displacement between the engine and chassis at each location along any mount axis where there is a relatively high input load component. Since relatively high input loads to the mounts are normally relatively infrequent during normal driving, the result will be reduced vibration and noise levels, and consequently a more comfortable and less fatiguing ride for the driver during normal driving.

In the preferred embodiment of mounts that will be hereinafter described, the vibration isolator portion comprises a discrete volume of elastomeric material (i.e. rubber) in the mounts having been cored out and metal parts of the mounts having been made in various rectangular and circular shapes. These features contribute to the ability to obtain different mount stiffnesses along each of the three principal axes of the mount, and in turn obtain an engine mounting system with desired stiffnesses in the three directions at each mount whereby the desired natural frequencies of the engine on the mounts are obtained. To ensure that engine motion is not excessive, built-in snubbing is provided at each mount. This snubbing prevents excessive engine motion that might otherwise occur when large torque and/or road load inputs are applied to the mounting system. Furthermore, the mounts are constructed and arranged to keep the engine captured in the chassis under extreme loading conditions.

The foregoing features, advantages, and benefits of the invention, along with additional ones, will be seen in the ensuing description and claims which should be considered in conjunction with the accompanying drawings. The drawings illustrate preferred embodiments of front and rear engine mounts according to the best mode contemplated at the present time in carrying out the invention.

DESCRIPTION OF THE PREFERRED EMBODIMENT

FIGS. 1-4 illustrate a preferred embodiment of front engine mount 10 according to principles of the present invention. Mount 10 has a principal axis 11 and comprises a vibration isolator portion 12 and a snubber portion 14 that is in axially spaced relation to vibration isolator portion 12 along axis 11. Vibration isolator portion 12 is disposed between the vehicle chassis and the engine. By way of example, the chassis is represented by a chassis-side bracket 16 and the engine by an engine-side bracket 18.

Figure 1:
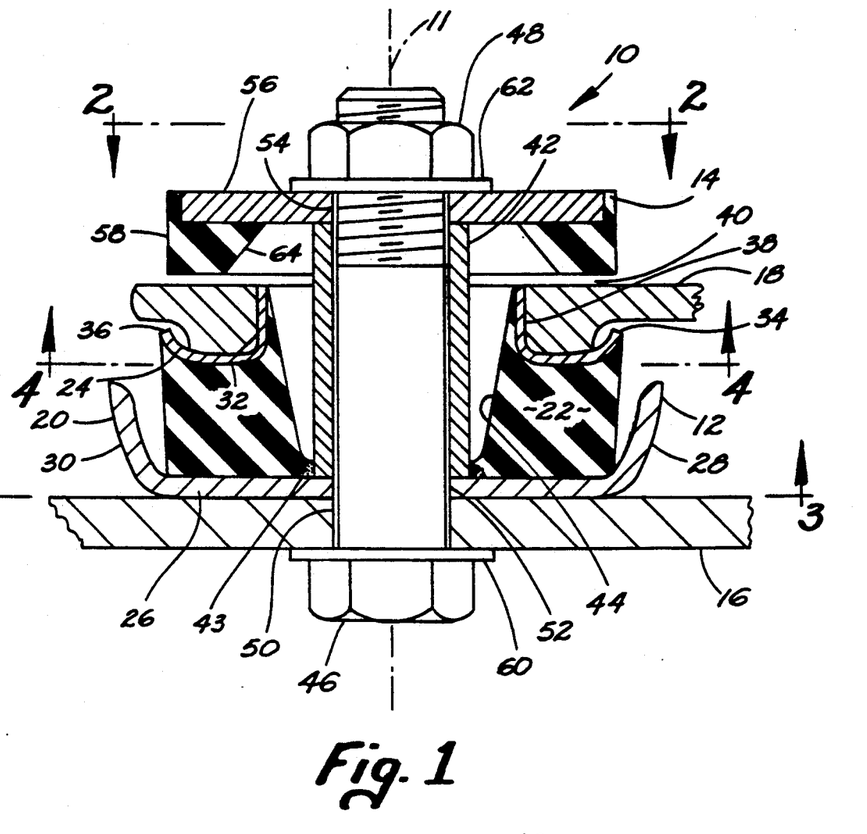
FIG. 1 is a side view, partly in section, through a preferred embodiment of front engine mount.
Figure 2:
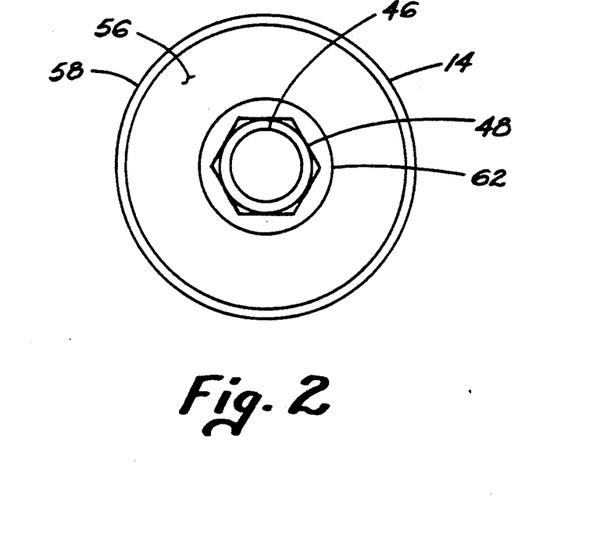
FIG. 2 is an axial view of the mount taken in the direction of arrows 2—2 in FIG. 1 on a reduced scale.
Figure 3:
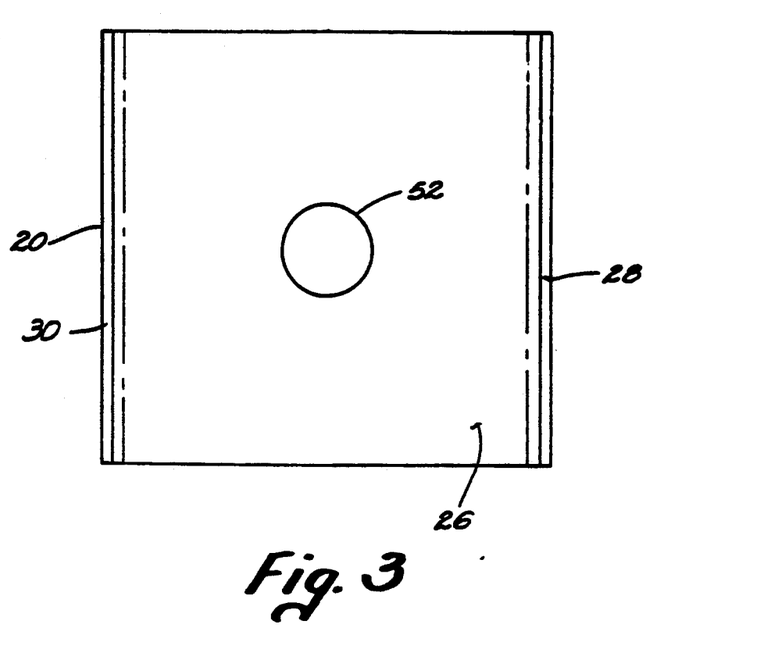
FIG. 3 is an axial view of the mount taken in the direction of arrows 3—3 in FIG. 1 on a reduced scale.
Figure 4:
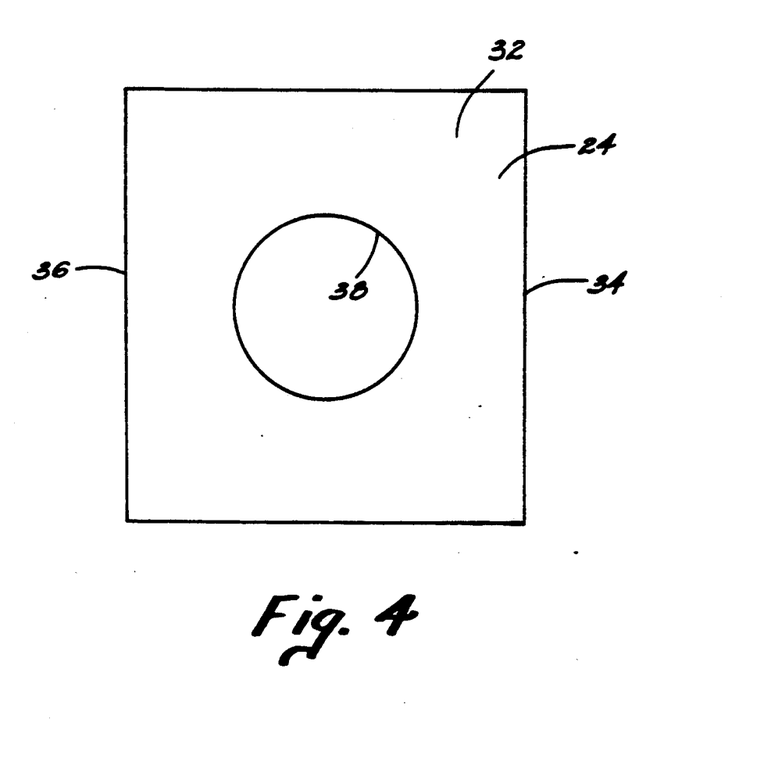
FIG. 4 is a cross sectional view taken in the direction of arrows 4—4 in FIG. 1 on a reduced scale.

Vibration isolator portion 12 comprises a first metal part 20, a second metal part 24, and an elastomeric part 22 joining parts 20 and 24. Part 20 has a generally overall rectangular shape comprising a flat rectangular portion, or base, 26 and flange portions 28 and 30 that extend longitudinally of base 26. The flange portions 28 and 30 are disposed at respective obtuse angles relative to base 26 so that the width across part 12, as measured between the top, or free, edges of flanges 28 and 30, is greater than the width as measured across the flanges immediately adjacent base 26.

Elastomeric part 22 also has an overall rectangular shape. The overall length of elastomeric part 22 is essentially equal to the overall length of part 20; the width of part 22 is essentially equal to the width of base 26 as measured across the narrowest point between flanges 28 and 30. The free height or axial dimension of part 22 is somewhat greater than the height of flanges 28 and 30, and it may be said that elastomeric part 22 fits in a nested relationship within the first metal part 20.

The second metal part 24 is made of less thick material than is part 20. Part 24 comprises a generally rectangularly shaped base 32 which is flat but has short upturned flanges 34 and 36 that are arranged parallel to flanges 28 and 30. The overall width of base 32 as measured between the outsides of flanges 34 and 36 is essentially equal to the width of elastomeric part 22. The length of part 24 is equal to the length of parts 20 and 22 and the organization and arrangement of the three parts 20, 22 and 24 is such that part 22 serves to join the lower face of base 32, including the outsides of flanges 34 and 36 with the upwardly facing interior surface of base 26.

Part 24 is also formed with a circular upstanding flange 38 that is coaxial with the mount axis 11. Flange 38 and base 32 are designed for reception of engine-side bracket 18.

FIG. 1 is intended to represent the uncompressed condition of the mount just prior to supporting the static engine load that is transmitted through engine-side bracket 18 to the chassis-side bracket 16. When the static load is applied, part 24 will be displaced downwardly a small amount resulting in a certain degree of compression of part 22 and a slight bulging thereof. In the static-load-bearing condition it can be appreciated that snubber portion 14 is spaced from the engine-side bracket 18 by a gap 40. Snubber portion 14 is supported on vibration isolator portion 12 by means of a circular cylindrical tube 42 that is coaxial with the mount axis 11. In FIG. 1 the lower end of tube 42 is shown affixed to base 26 of part 20, such as by welding 43 for example. Part 22 comprises a frustoconically tapered hole 44 via which tube 42 passes through part 22. Hole 44 extends from the bottom of tube 42 to the top of flange 38. The inside diameter of flange 38 is greater than the outside diameter of tube 42 so that there is an appreciable clearance space between the two. Tube 42 has a sufficient height that a predetermined axial dimension is provided for gap 40 in the static design load condition.

Snubber portion 14 is a separate part which fits to the upper end of tube 42 and is held in assembly relationship to vibration isolator portion 12 by means of a throughbolt 46 and nut 48. The shank of the throughbolt passes through suitable holes 50 and 52 in bracket 16 and base 26, through the interior of tube 42, and finally through a suitable hole 54 in a circular metal part 56 that is one part of snubber portion 14. The other part of snubber portion 14 is a circular annular elastomeric part 58. A washer 60 is shown interposed between the head of throughbolt 46 and chassis-side bracket 16. Nut 48 contains a flange 62 that is disposed against metal part 56.

Elastomeric part 58 has an overall diameter slightly greater than the outside diameter of part 56 so that in this way the elastomeric part 58 joins to the side edge surface as well as the outer margin of the bottom surface of part 56, as shown. The inside diameter of elastomeric part 58 has a frustoconical taper 64 that is in radially spaced relationship to the outside diameter of tube 42.

The mount operates in the following manner. When dynamic input loads are relatively low along axis 11 or any other axis, there is comparatively small relative displacement between the engine-side bracket 18 and the chassis-side bracket 16. Such dynamic loads are effectively isolated by the elastomeric part 22 of vibration isolator portion 12. Thus, dynamic loads, in particular those that produce noise and vibration, are reduced in amplitude as the energy travels from the engine-side bracket 18 to the chassis-side bracket 16. As such, part 22 can comprise an elastomer that results in relatively low stiffness for producing less vibration in the chassis-side bracket 16 which in turn results in less sound level in the vehicle cab interior.

Larger displacements of the engine-side bracket 18 relative to the chassis-side bracket 16 will result in additional interactions occurring. If there is an upward displacement of the engine-side bracket along the direction of the main axis 11, snubber portion 14 will come into play. Thus, if gap 40 is closed by what would begin to be an excessive amount of displacement, the elastomeric part 58 will begin to be compressed by the excessive motion of the engine-side bracket. The elastomeric part 58 is made of a comparatively high stiffness so as to quickly limit the excessive displacement. Metal part 56 is made sufficiently thick to support and react the loads that are transmitted through elastomeric part 58 during those times when snubber portion 14 is active in reacting what would otherwise become excessive engine displacement in the direction away from the chassis-side bracket. If there is a downward displacement of the engine-side bracket along the direction of main axis 11, flanges 28 and 30 act as snubbers by limiting, or constraining, the bulging of the rubber 22.

The vibration isolator portion 12 also has certain snubbing features that become active for what would otherwise be excessive engine displacement in directions other than the axial direction along the main axis 11 of the engine mount. For example, the beginning of what would otherwise become excess fore and aft motion is constrained by abutment of the longitudinal sides of elastomeric part 22 with the respective flanges 28 and 30. The action of surface 44 and flange 38 with tube 42 provides additional snubbing in the fore and aft direction. Similarly, the beginning of what would otherwise become excessive displacements that are into and out of the plane of drawing FIG. 1 will be snubbed by action of the frustoconical surface 44 and flange 38 against the outside of tube 42. By varying the dimensions of the various snubbing gaps within certain ranges, it is possible to establish the points at which snubbing action will become effective along each direction.

It will be appreciated that the specific snubbing action that occurs will be a function of the particular direction or directions along which incipient excessive displacement or displacements begin. Hence, when there is incipient excessive displacement in one direction, snubbing action will occur along that direction by the appropriate snubber, and for incipient excessive displacements along more than one direction, the resulting snubbing action will be a combination of individual snubbing actions.

The tapered hole 44 in elastomeric part 22 constitutes a void that endows the mount with a vertical stiffness that is independent from the horizontal stiffnesses. The horizontal stiffnesses, which are into and out of the plane of the drawing figure along one axis and in the plane of the drawing figure perpendicular to axis 11 along the other axis, are fairly close to each other. The vertical stiffness is considerably larger than the horizontal stiffnesses. This combination of stiffnesses optimizes the mount for vibration isolation and noise reduction. Thus the engine mount has been shown to comprise a construction in which the vibration isolator portion comprises first and second spaced apart metal parts that are joined together by an elastomeric part, one of said parts being on the chassis side of the mount and the other of side metal parts being on the engine side of the mount with the elastomeric part being disposed between the two metal parts such that forces acting on the mount are transmitted through the elastomeric part, and in which the snubber portion comprises a third metal part that is rigidly joined to a particular one of said first and second metal parts and is disposed in spaced relation to said vibration isolator portion when the mount is in static load-bearing condition and a second elastomeric part that is joined to said third metal part and is disposed between said third metal part and said vibration isolator portion and said snubber portion is effective to limit relative displacement between said first and second metal parts.

FIGS. 5-8 illustrate a preferred embodiment of rear engine mount 110 according to principles of the invention. Like mount 10, mount 110 has a principal axis 111 and comprises a vibration isolator portion 112 and a snubber portion 114 that is in axially spaced relation to vibration isolator portion 112 along axis 111; however, the specific shape of vibration isolator portion 112 is different from embodiment 12 and snubber portion 114 is in underlying relation thereto.

The vibration isolator portion 112 of mount 110 has three independent stiffnesses along the three principal axes namely vertical, fore and aft, and lateral. The vertical axis is along axis 111, the fore and aft direction lies in the plane of the drawing FIG. 5 perpendicular to axis 111, and lateral direction is into and out of the plane of the drawing figure. Vibration isolator portion 112 is disposed between a representative chassis-side bracket 116 and a representative engine-side bracket 118, and it comprises a first metal part 120, a second metal part 122, and an elastomeric part 124. Part 124 serves to join parts 120 and 122 to form the vibration isolator. Part 120, which may be a casting or forging, has a flat bottom surface 126 that is of generally rectangular shape with ears at the four corners and is disposed against a flat upwardly facing surface portion 128 of bracket 116. The ears contain holes 130, and part 120 is secured to bracket 116 by screws 131 that are passed upwardly through holes in bracket 116 and into holes 130.

Figure 5:
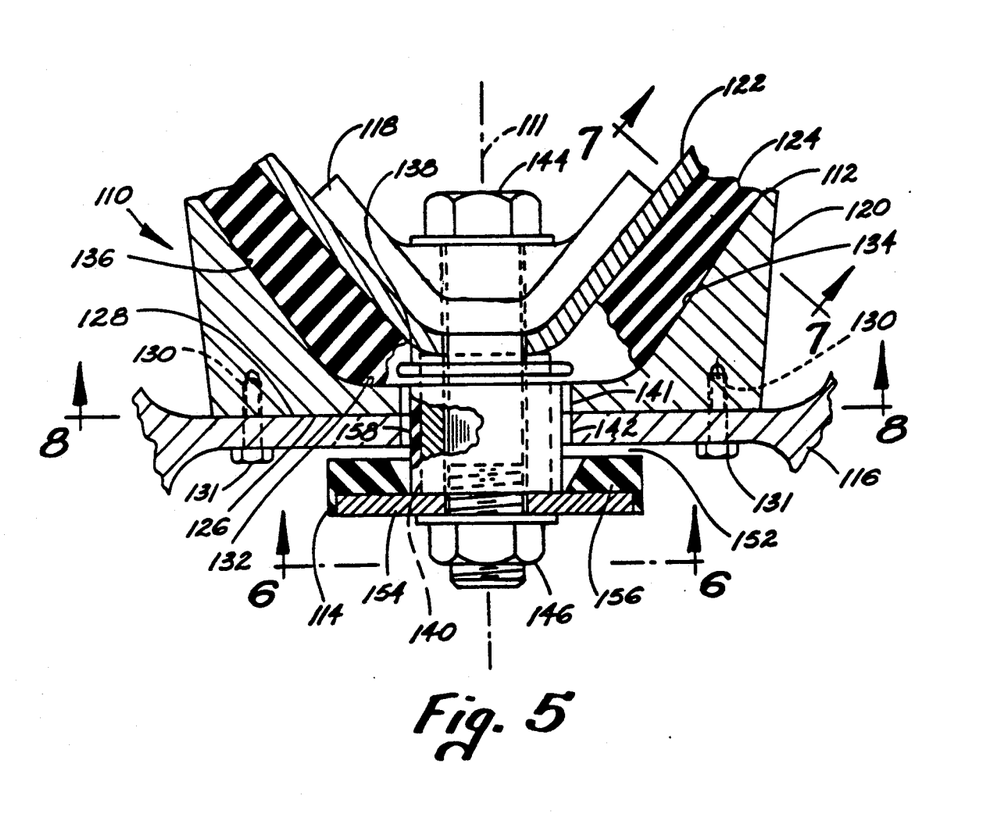
FIG. 5 is a side view, partly in section, through a preferred embodiment of rear engine mount.
Figure 6:
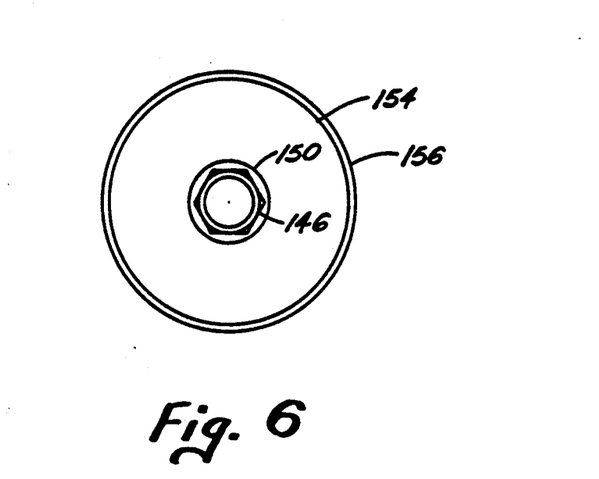
FIG. 6 is an axial view taken in the direction of arrows 6—6 in FIG. 5 on a reduced scale.
Figure 7:
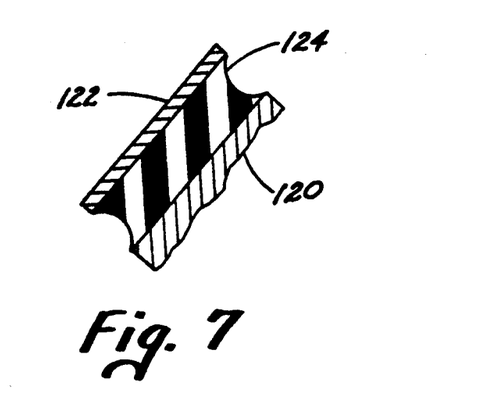
FIG. 7 is a cross sectional view taken in the direction of arrows 7—7 in FIG. 5 on a reduced scale.
Figure 8:
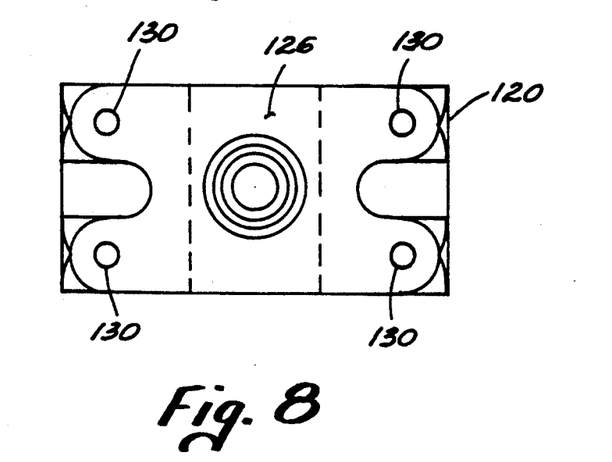
FIG. 8 is a view taken in the direction of arrows 8—8 in FIG. 5 on a reduced scale.

The upper surface of part 120 has a generally concave shape that is defined by a central flat surface portion 132 and generally flat side surface portions 134, 136 that are inclined to surface portion 132 on opposite sides. Metal part 122 and elastomeric part 124 have similar concave shapes, as does engine-side bracket 118. In this way bracket 118 and parts 122, 124 are arranged in a nested relationship on the upper surface of part 120.

The thickness of part 124 is made narrower over the central region of the vibration isolator than it is over the inclined side regions. The central region of part 124 also includes a wide, narrow void 138 that is centered at the midpoint of the central region's thickness and width.

Snubber portion 114 is disposed in underlying relationship to chassis-side bracket 116. A circular, cylindrical tube 140, whose upper end is joined to part 122 by welding, projects centrally downwardly from metal part 122 through a hole in part 124. It continues through a hole 141 in part 120 and through a circular clearance hole 142 in chassis-side bracket 116, ending a certain distance below bracket 116. Snubber portion 114 is disposed against this lower end of tube 140 and is held thereon in assembly relationship by a throughbolt 144 and nut 146 in similar manner to that described for the front mount. The dimensions of the several parts are such that in the approximate loaded condition that is represented by FIG. 5, the snubber portion 114 is spaced below the chassis-side bracket by a gap 152.

Snubber portion 114 has a construction that is virtually identical with that previously described for snubber 14, except that snubber portion 114 is disposed upside down in FIG. 5 from the orientation in FIG. 1. As such, snubber portion 114 may be briefly described as having a circular metal part 154 and a circular annular elastomeric part 156.

The sidewall of tube 140 is not bare as is tube 42. Rather, the sidewall of tube 140 is covered by a generally uniform thickness of elastomer 158 that extends from, and is integral with, elastomer 124. The purpose of this elastomeric covering is for a snubbing action that will be described. The general construction of the rear mount having been described, a description of its operation can now be given.

A normal range of relatively low dynamic input forces acting through the engine-side bracket 118 will be isolated from the chassis-side bracket 116 by elastomer 124 whose stiffness is made relatively low. Forces that tend to create larger engine displacements are snubbed by the various snubbing actions that can occur in the mount.

For relative downward displacement of the engine-side bracket to the chassis-side bracket that would otherwise give rise to excessive displacement, void 138 collapses so that there is only a small thickness of elastomer between confronting portions of the central regions of metal parts 122 and 120. This limits the extent of downward displacement. For relative upward displacement of the engine-side bracket to the chassis-side bracket, snubber portion 114 becomes active against the bottom of the chassis-side bracket to limit upward displacement. By varying gap 152 or void 138 the displacement amplitude at which the mount stiffness increases can be shifted.

Hole 141 and/or 142 is sized to define a generally uniform annular gap around the elastomeric-coated sidewall of tube 140. For what would otherwise be excessive fore and aft displacements between the engine-side bracket and the chassis-side bracket, the coated sidewall of tube 140 will bear against hole 141 and/or 142 to provide snubbing. The same snubbing action between tube 140 and hole 141 and/or 142 occurs to limit displacement into and out of the plane of FIG. 5. Hence, the rear mount provides snubbing along the three principal directions.

Figure 9:
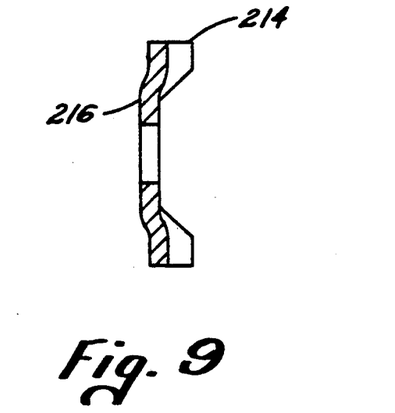
FIG. 9 is a view of an alternate shape for a snubber on a reduced scale.

FIG. 9 shows an alternate shape for snubber portions 14, 114. The snubber portion 214 of FIG. 9 has the central region 216 of its metal part in a crown or dome shape. This alternate shape allows use of common tube lengths while varying elastomer thickness.

It is to be appreciated that the foregoing description ha been presented with respect to specific embodiments. In these embodiments the metal parts are steel and the elastomeric parts are neoprene. Joining of the elastomeric parts to the metal parts is conducted by conventional molding procedures. Attainment of desired durometers for the elastomeric parts is accomplished in conventional ways. Principles of the invention are not intended to be limited to specified dimensions, materials, or durometers. In FIG. 1, part 22 is 45-55 durometer neoprene and part 58 is 70 durometer neoprene. In FIG. 5, part 124, including sleeve 158 around tube 140, is 70 durometer neoprene and part 156 is 70 durometer neoprene.

As noted earlier, the vibration isolator portion 112 of mount 110 has three independent stiffnesses along the three principal axes namely vertical, fore and aft, and lateral. In general, the three independent stiffnesses may be described as soft in the lateral direction, intermediate in the vertical direction, and hard in the fore and aft direction. The vibration isolator reacts lateral forces in pure shearing of the rubber part 124. Fore and aft forces and vertical forces are reacted by a combination of shearing and compression of rubber part 124 due to the fact that the side portions of part 124 are at an angle.

As viewed in FIG. 5, the parts 118, 122, 124 and 120 may be considered to have a truncated V-shape. It is the sides of the V-shape that are at an angle to the truncated base portion. The sides are also at an angle to axis 111. The particular angle of the sides of the truncated V determines the relative proportions of shear and compression in rubber part 124 in response to both fore and aft loads and vertical loads. For fore and aft loads, one side of the truncated V-shape of rubber part 124 is in combined shear and compression while the opposite side will have tensile strains minimized. For vertical loads, the truncated V-shape is an advantage because the tensioning of the rubber is related to the extent of inclination of the sides of the truncated V from axis 111.

The absense of rubber in the wide narrow void 138 and in the annular void between rubber-coated tube 140 and the mount base hole 141 contributes to obtaining three independent stiffnesses along the three principal axes of the mount. This further allows the performance of the mount to be optimized for vibration isolation and noise reduction.

What is claimed is:

1. In an automotive vehicle which has a chassis that supports an engine which powers the vehicle, the support of the engine by the chassis comprising an engine mount that provides good vibration isolation without allowing excessive engine displacement, the improvement in said engine mount which comprises a vibration isolator portion and a snubber portion, said vibration isolator portion comprising first and second spaced apart metal parts that are joined together by an elastomeric part, one of said metal parts being on the chassis side of the mount and the other of said metal parts being on the engine side of the mount with the elastomeric part being disposed between the two metal parts such that forces acting on the mount are transmitted through the elastomeric part, said mount being operable to a static load-bearing condition wherein only the engine's static weight acts through the mount to partially compress the elastomeric part and to a dynamic load-bearing condition wherein input vibrations act through the mount, said snubber portion comprising means to limit displacement in a particular direction between the engine and the chassis at said mount, and hence limit displacement of the first metal part relative to the second metal part, said snubber portion comprising a third metal part that is rigidly joined to a particular one of said first and second metal parts wherein a gap is disposed between said snubber portion and said vibration isolator portion in said static load-bearing condition, and said snubber portion further comprising a second elastomeric part that is joined to said third metal part and is disposed between said third metal part and said vibration isolator portion, in said static load-bearing condition and for input vibrations within a certain low amplitude range between zero amplitude and a selected amplitude greater than said second elastomeric part being disposed uncompressed in spaced apart relation to said vibration isolator portion, and hence performing no snubbing of relative displacement of said other metal part to said one metal part, when the mount is in said static load-bearing condition, and when the mount is in said dynamic load-bearing condition, said second elastomeric part becomes compressed between said third metal part and said vibration isolator portion to perform snubbing of relative displacement of said other metal part to said one metal part.

2. The improvement as set forth in claim 1 in which said first elastomeric part comprises a through-hole and wherein said third metal part is joined to a particular one of said first and second metal parts by a metal tube that passes through the through-hole in said first elastomeric part.

3. The improvement as set forth in claim 2 in which said though-hole in said first elastomeric part has a frustoconical shape that tapers outwardly in the direction away from the particular one of said first and second metal parts to which said tube is joined.

4. The improvement as set forth in claim 2 in which said first elastomeric part further comprises a void that intercepts said through-hole in said first elastomeric part.

5. The improvement mount as set forth in claim 1 in which said first and second metal parts have generally rectangular shaped areas confronting each other in a generally parallel relationship and said first elastomeric part is of solid rectangular mass joining one of said generally rectangular shaped areas of said first and second metal parts to the other of said generally rectangular shaped areas of said first and second metal parts.

6. The improvement as set forth in claim 5 in which said third metal part is rigidly joined to said first metal part, said first elastomeric part and said second metal part have holes, said first and third metal parts are rigidly joined by a tube passing through the holes in said first elastomeric part and said second metal part, and including a flange in said second metal part bounding the hole therein.

7. The improvement as set forth in claim 6 in which said flange and said hole in said second metal part are circular in shape and said flange projects away from said first elastomeric part, said hole in said first elastomeric part having a frustoconical taper extending between said flange and the location where said tube joins said first metal part.

8. The improvement as set forth in claim 7 in which said third metal part and said second elastomeric part are each circular in shape.

9. The improvement as set forth in claim 1 in which said first and second metal parts have respective convex and concave faces arranged in a nested relationship to each other and said first elastomeric part is disposed between said convex and concave faces of said first and second metal parts.

10. The improvement as set forth in claim 9 in which said first and second metal parts have flat central regions confronting each other, said flat central regions being disposed perpendicular to a further metal part that passes through a hole in a central region of said first elastomeric part and that serves to rigidly join said third metal part to a particular one of said first and second metal parts, and wherein said first and second metal parts further comprise laterally disposed outer regions that are at angles to their respective central regions, said fist elastomeric part having its central region disposed between the central regions of the first and second metal parts and laterally outer regions that are disposed between the laterally disposed outer regions of the first and second metal parts.

11. The improvement as set forth in claim 10 in which the central region of the first elastomeric part comprises a void that is arranged generally transversely to the direction in which the metal part that rigidly joins said third metal part to a particular one of said first and second metal parts passes through the central region of said first elastomeric part.

12. The improvement as set forth in claim 11 in which said first elastomeric part is thinner in its central region than it is in its laterally disposed outer regions.

13. The improvement as set forth in claim 1 in which said first and second metal parts have generally flat areas confronting each other in a generally parallel relationship and in which one of said first and second metal parts comprises flange means extending from the generally flat area thereof so as to bound a corresponding side portion of said first elastomeric part.

14. The improvement as set forth in claim 13 in which said flange means comprises a pair of flanges on opposite sides of the generally flat area of said one of said first and second metal parts, said flanges being disposed at respective obtuse angles with respect to the generally flat area of said one of said first and second metal parts.

15. The improvement as set forth in claim 1 in which said third metal part is rigidly joined to a particular one of said first and second metal parts by a rigid metal member that passes through a hole in said first elastomeric part, said hole having a frustroconical shape that tapers outwardly in a direction away from said particular one of said first and second metal parts.

16. An engine mount disposed between the chassis and the engine of an automotive vehicle comprising first and second spaced apart metal parts that are joined together by an elastomeric part, one of said metal parts being on the chassis side of the mount and the other of said metal parts being on the engine side of the mount with the elastomeric part being disposed between the two metal parts such that forces acting on the mount are transmitted through the elastomeric part, such forces including both dynamic force due to input vibrations and static force due to the static weight of the engine being transmitted through the mount to the chassis, and snubber means mounted on said first metal part for cooperative interaction with said second metal part to limit displacement of said second metal part in one or more particular directions, a gap disposed between said snubber means and said second metal part when the engine mount is subject to only said static force, said snubber means comprising an elastomeric element that is disposed on a rigid member joined to said one metal part by means passing through holes in said elastomeric part and said second metal part, and said second elastomeric part being disposed uncompressed in spaced apart relation to said second metal part due to said gap, and hence performing no snubbing of relative displacement of said second metal part to said first metal part, when the mount is subject only to said static force, but when the mount is subject to said dynamic force, said second elastomeric part becoming compressed between said rigid member and said second metal part to perform snubbing of relative displacement of said second metal part to said first metal part.

17. An engine mount disposed between the chassis and the engine of an automotive vehicle as set forth in claim 16 in which said other metal part has a flange surrounding the hole therein, and said hole in said elastomeric part has a frustoconical shape extending from said one metal part to said flange of said other metal part.

18. An engine mount vibration isolator for mounting an engine on a chassis comprising first and second truncated V-shaped metal parts, each of which has a base portion having opposite ends and side portions diverging from respective ends of said base portion at an obtuse angle to said base portion, a truncated V-shaped elastomeric part that is disposed between and joins said first and second metal parts, said elastomeric part having a base portion having opposite ends and side portions diverging from respective ends of said elastomeric part's base portion at an obtuse angle to said elastomeric part's base portion, said first and second metal parts and said elastomeric part being disposed in nested relationship wherein each side portion of said elastomeric part is disposed between and joins corresponding side portions of said first and second metal parts, and said base portion of the elastomeric part is disposed between and joins the base portions of said first and second metal parts, said engine mount vibration isolator having three axes with different stiffnesses along each axis, said truncated V-shaped metal and elastomeric parts being truncated V-shaped when viewed among only one of said three axes, and in which the base portions of said first and second metal parts are disposed closer to each other than the corresponding side portions of said first and second metal parts are to each other, and in which the base portion of said elastomeric part has a thickness that is less than the thickness of each side portion of said elastomeric part, in which said second metal part is disposed below said elastomeric part and is toward the chassis, in which said elastomeric part is disposed below said first metal part, in which said first metal part is toward the engine, in which said first metal part, said second metal part, and said elastomeric part are arranged to have their respective base portions below their respective side portions, in which said first metal part supports an engine bracket thereon and said second metal part is supported on a chassis bracket, and further including through-hole means passing through said elastomeric part, one of said metal parts and one of said brackets, snubber means comprising a rigid metal part and an associated elastomeric snubber part arranged such that said snubber part is disposed between said one of said brackets and said rigid metal part, rigid support means extending from the other of said metal parts through said through-hole means to said rigid metal part of said snubber means to dispose said snubber means such that when said snubber means is not performing snubbing, said snubber means is spaced by means of a gap from said one of said brackets and when said snubber means is performing snubbing, said elastomeric snubber part is compressed between said rigid metal part and said one of said brackets thereby eliminating said gap, and fastening means extending from said other of said brackets through a hole in said other metal part and through said through-hole means to said snubber means to keep said first metal part, said first-mentioned elastomeric part, said second metal part, and said one of said brackets captured between said other of said brackets and said snubber means.

19. An engine mount vibration isolator as set forth in claim 18 wherein there is at least one void in said first-mentioned elastomeric part that affects the stiffness along a corresponding axis, said through-hole means passing through said void.

20. An engine mount vibration isolator as set forth in claim 18 wherein said rigid support means is a tube and said fastening means extends through said tube.

21. The improvement as set forth in claim 1 in which an engine side bracket is supported on said other metal part, and in which the compression of said second elastomeric part between said third metal part and said vibration isolator portion comprises compression of said second elastomeric part between said third metal part and said engine side bracket.

22. The improvement as set forth in claim 1 in which said vibration isolator portion is supported on a chassis side bracket, and in which the compression of said second elastomeric part between said third metal part and said vibration isolator portion comprises compression of said second elastomeric part between said third metal part and said chassis side bracket.

* * * * *